US012312222B2

(12) United States Patent
Du et al.

(10) Patent No.: US 12,312,222 B2
(45) Date of Patent: May 27, 2025

(54) LIFTING MECHANISM

(71) Applicants: Danfoss Power Solutions (Jiangsu) Co., Ltd., Jiangsu (CN); Danfoss Power Solutions Inc., Ames, IA (US)

(72) Inventors: Zhekang Du, Nordborg (DK); Xiaozhong Chen, Nordborg (DK)

(73) Assignees: DANFOSS POWER SOLUTIONS (JIANGSU) CO., LTD, Jiangsu (CN); DANFOSS POWER SOLUTIONS INC., Ames, IA (US)

( * ) Notice: Subject to any disclaimer, the term of this patent is extended or adjusted under 35 U.S.C. 154(b) by 277 days.

(21) Appl. No.: 17/887,736

(22) Filed: Aug. 15, 2022

(65) Prior Publication Data

US 2023/0174353 A1 Jun. 8, 2023

(30) Foreign Application Priority Data

Dec. 6, 2021 (CN) ........................ 202111482079.2

(51) Int. Cl.
*B66F 3/32* (2006.01)
*F15B 11/04* (2006.01)
(Continued)

(52) U.S. Cl.
CPC ................ *B66F 3/32* (2013.01); *F15B 11/04* (2013.01); *F15B 13/02* (2013.01); *F15B 13/06* (2013.01);
(Continued)

(58) Field of Classification Search
CPC .......... B66F 3/32; F15B 11/04; F15B 11/068; F15B 13/02; F15B 13/06; F15B 15/18;
(Continued)

(56) References Cited

U.S. PATENT DOCUMENTS 3,512,072 A 5/1970 Karazija et al.
3,630,025 A * 12/1971 Henry ....................... B66F 9/22 60/434

(Continued)

FOREIGN PATENT DOCUMENTS

CN 102134048 A 7/2011
CN 203321761 U 12/2013

(Continued)

OTHER PUBLICATIONS

T. Minav et al. "Electric energy recovery system for a hydraulic forklift—theoretical and experimental evaluation." IET Electric Power Applications. 2011. pp. 377-385. vol. 5, Iss. 4.

(Continued)

*Primary Examiner* — Minh Q Le
(74) *Attorney, Agent, or Firm* — McCormick, Paulding & Huber PLLC

(57) ABSTRACT

The lifting mechanism includes a battery, an electric machine, a hydraulic pump, an oil tank, a hydraulic cylinder, a work platform and a proportional valve or switch valve. In the energy-regeneration mode, the hydraulic fluid drives the hydraulic pump to operate as a hydraulic motor, thus in turn driving the electric machine to operate as a generator and charge the battery. In the present application, the hydraulic pump operates to increase a pressure in a hydraulic line between the hydraulic pump and the proportional valve or switch valve before the proportional valve or switch valve is switched from a unidirectional communication position to a bidirectional communication position. When the proportional valve or switch valve is switched from the unidirectional communication position to the bidirectional communication position, by increasing the pressure in the hydraulic line, it could be avoided that the volume of hydraulic fluid has low pressure is compressed because the hydraulic fluid has low pressure is communicated with hydraulic fluid has (Continued)

high pressure; therefore a state of sudden drop of the work platform is avoided, and safety performance and operating experience of the lifting mechanism is improved.

23 Claims, 3 Drawing Sheets

(51) Int. Cl.

| | |
|---|---|
| ***F15B 13/02*** | (2006.01) |
| ***F15B 13/06*** | (2006.01) |
| ***F15B 15/18*** | (2006.01) |
| *F15B 11/028* | (2006.01) |
| *F15B 11/044* | (2006.01) |
| *F15B 11/068* | (2006.01) |
| *F15B 20/00* | (2006.01) |

(52) U.S. Cl.
CPC ............. *F15B 15/18* (2013.01); *F15B 11/028* (2013.01); *F15B 11/044* (2013.01); *F15B 11/068* (2013.01); *F15B 13/023* (2013.01); *F15B 20/005* (2013.01); *F15B 2211/20515* (2013.01); *F15B 2211/20561* (2013.01); *F15B 2211/40* (2013.01); *F15B 2211/40515* (2013.01); *F15B 2211/413* (2013.01); *F15B 2211/41527* (2013.01)

(58) Field of Classification Search
CPC ... F15B 2211/40; F15B 11/028; F15B 11/044; F15B 13/023; F15B 20/005; F15B 2211/20515; F15B 2211/20561; F15B 2211/40515; F15B 2211/413; F15B 221/41527
USPC ...................................................... 137/565.19
See application file for complete search history.

(56) References Cited

U.S. PATENT DOCUMENTS

| | | | | | |
|---|---|---|---|---|---|
| 3,774,726 | A * | 11/1973 | Bredberg | B66F 9/20 | 91/451 |
| 3,947,744 | A | 3/1976 | Grace et al. | | |
| 4,690,606 | A | 9/1987 | Ross | | |
| 4,723,107 | A | 2/1988 | Schmid | | |
| 5,012,898 | A | 5/1991 | Tsymberov | | |
| 5,024,141 | A | 6/1991 | Kawada | | |
| 5,505,043 | A | 4/1996 | Baginski et al. | | |
| 5,649,422 | A | 7/1997 | Baginski et al. | | |
| 5,862,663 | A | 1/1999 | Anza et al. | | |
| 6,005,360 | A | 12/1999 | Pace | | |
| 6,189,432 | B1 | 2/2001 | Colarelli et al. | | |
| 6,848,253 | B2 | 2/2005 | Johansson et al. | | |
| 7,770,697 | B2 | 8/2010 | Futahashi et al. | | |
| 8,246,008 | B2 | 8/2012 | De Jong et al. | | |
| 9,422,949 | B2 | 8/2016 | He et al. | | |
| 9,482,248 | B2 | 11/2016 | Ma et al. | | |
| 10,844,879 | B2 | 11/2020 | Ueda | | |
| 10,927,854 | B2 | 2/2021 | Olesen et al. | | |
| 11,441,585 | B2 | 9/2022 | Buscicchio et al. | | |
| 2004/0003589 | A1 | 1/2004 | Johansson et al. | | |
| 2008/0041047 | A1* | 2/2008 | Kato | B66F 9/20 | 60/431 |
| 2011/0198141 | A1 | 8/2011 | Clark et al. | | |
| 2012/0023924 | A1 | 2/2012 | Clark et al. | | |
| 2014/0283509 | A1* | 9/2014 | Hijikata | F15B 21/14 | 60/459 |
| 2014/0331662 | A1* | 11/2014 | Ueda | F15B 11/044 | 60/431 |
| 2015/0013324 | A1* | 1/2015 | Matsuo | F15B 21/14 | 60/459 |
| 2019/0002258 | A1 | 1/2019 | Zhou et al. | | |
| 2020/0317065 | A1 | 10/2020 | Lombardo | | |
| 2023/0174354 | A1* | 6/2023 | Du | B66F 9/22 | 254/93 R |

FOREIGN PATENT DOCUMENTS

| | | | |
|---|---|---|---|
| CN | 103539037 | B | 2/2016 |
| CN | 206889376 | U | 1/2018 |
| CN | 207819534 | U | 9/2018 |
| CN | 110454445 | A | 11/2019 |
| CN | 212868045 | U | 4/2021 |
| CN | 113809797 | A | 12/2021 |
| CN | 215486885 | U | 1/2022 |
| DE | 2804720 | A1 | 8/1978 |
| DE | 102011053958 | A1 | 3/2013 |
| DE | 102014105127 | A1 | 10/2015 |
| EP | 1193211 | B1 | 1/2007 |
| GB | 1294249 | A | 10/1972 |
| GB | 1365511 | A | 9/1974 |
| GB | 2502060 | A | 11/2013 |
| IN | 112688390 | A | 4/2021 |
| JP | H02-028499 | A | 1/1990 |
| JP | 3376263 | B2 | 2/2003 |
| JP | 2003192299 | A | 7/2003 |
| JP | 2005053693 | A | 3/2005 |
| JP | 2008087914 | A | 4/2008 |
| JP | 2009298543 | A | 12/2009 |
| SU | 1661140 | A1 | 7/1991 |
| WO | 2022/105098 | A1 | 5/2022 |

OTHER PUBLICATIONS

Tatiana A. Minav et al. "Detailed analysis of electro-hydraulic lifting system's energy efficiency with direct electric drive pump control." Automation in Constructions. 2013. 17 pages.
Tatiana Minav et al. "Electric or Hydraulic Energy Recovery Systems in a Reach Truck—A Comparison." Journal of Mechanical Engineering. 2014. pp. 232-240. vol. 60, Iss 4.
Lukasz Stawinski et al. "Energy Consumption Structure and Its Improvement of Low-Lifting Capacity Scissor Lift." Energies. Mar. 2, 2021. 14 pages. vol. 14.
First Office Action for Canadian Patent Application No. 3,164,508, dated Oct. 24, 2023.
First Office Action for Canadian Patent Application No. 3,164,505, dated Oct. 17, 2023.

* cited by examiner

LIFTING MECHANISM

CROSS-REFERENCE TO RELATED APPLICATION

This application claims foreign priority benefits under U.S.C. § 119 from Chinese Patent Application No. 202111482079.2, filed Dec. 6, 2021, the content of which is hereby incorporated by reference in its entirety.

TECHNICAL FIELD

The present application relates to the mechanical technical field, and specifically to a lifting mechanism.

BACKGROUND

A lifting mechanism is working tool widely used in the fields of aerial working, cargo transportation, etc. With the development of technology, electrically driven lifting mechanisms become more and more widely used. In order to extend the service life of a battery, the battery is charged by converting the potential energy that the work platform in the lifting mechanism has due to descending into electric energy. However, during conversion of potential energy into electric energy, there may be a certain safety hazard in the lifting mechanism.

SUMMARY

In view of this, embodiments of the present application aim to provide a lifting mechanism to improve the safety performance of the lifting mechanism. A hydraulic pump operates to increase the pressure in a hydraulic line between the hydraulic pump and a proportional valve or switch valve before the proportional or switch valve is switched from a unidirectional communication position to the bidirectional communication position. By increasing the pressure in the hydraulic line, a sudden drop of hydraulic fluid, when the proportional valve or switch valve is switched due to a high pressure difference across the proportional valve or switch valve, could be avoided.

In the present application, a lifting mechanism is provided. The lifting mechanism includes a battery, an electric machine, a hydraulic pump, an oil tank, a hydraulic cylinder and a work platform; the lifting mechanism includes a lifting mode, a hold mode and a lowering mode, the lowering mode includes an energy-regeneration mode in which a hydraulic fluid drives the hydraulic pump to operate as a hydraulic motor, and thus in turn hydraulic fluid drives the electric machine to operate as a generator and charge the battery; the proportional valve or switch valve is provided on the hydraulic line between the hydraulic pump and the hydraulic cylinder; the proportional valve or switch valve includes a bidirectional communication position, and a unidirectional communication position in which the hydraulic fluid is permitted to flow from the hydraulic pump to the hydraulic cylinder in a unidirectional way; in the lifting mode or the hold mode, the proportional valve or switch valve is in the unidirectional communication position, and in the lowering mode, the proportional valve or switch valve is in the bidirectional communication position; the hydraulic pump operates to increase the pressure in a hydraulic line between the hydraulic pump and the proportional valve or switch valve before the proportional valve or switch valve is switched from the unidirectional communication position to the bidirectional communication position.

After the hydraulic pump operates to increase the pressure in the hydraulic line, the proportional valve or switch valve is switched from the unidirectional communication position to the bidirectional communication position, and the lifting mechanism is switched to the lowering mode. Thus, it could be avoided that, when the proportional valve or switch valve is switched from the unidirectional communication position to the bidirectional communication position, a volume of the hydraulic fluid is compressed because a pressure difference across the proportional valve or switch valve is too high, and thus a sudden drop of the work platform is avoided. A sense of falling is felt by a user on the work platform may be avoided, so that it may be ensured that the work platform descends smoothly and stably after the lifting mechanism is switched to the lowering mode.

In an embodiment, the lifting mechanism further includes a control device. In response to receiving a lowering command, the control device controls the operation of the hydraulic pump to operate so that the pressure in the hydraulic line between the hydraulic pump and the proportional valve or switch valve is increased to the value equal to the pressure of hydraulic cylinder or a pressure difference between the hydraulic cylinder and the hydraulic line is less than a predetermined value.

The lower the pressure difference across the proportional or switching valve, is the more stable the work platform will be. Therefore, when receiving a lowering command, the hydraulic pump operates to increase the pressure in the hydraulic line so that the pressure different across the proportional valve or switch valve is less than a predetermined value. So that it may be ensured that a sudden drop of the work platform is avoided, and thus safety hazards are eliminated.

In an embodiment, the lifting mechanism further includes a control device. The control device controls the proportional valve or switch valve to switch from the unidirectional communication position to the bidirectional communication position when the pressure in the hydraulic line between the hydraulic pump and the proportional valve or switch valve is increased to a value equal to the pressure of hydraulic cylinder or the pressure difference between the hydraulic cylinder and the hydraulic line is less than a predetermined value.

In an embodiment, the lifting mechanism further includes a control device. The control device controls the proportional valve or switch valve to switch from the unidirectional communication position to the bidirectional communication position when the hydraulic pump has run for a predetermined period of time.

A predetermined rotational speed and the predetermined period of time are stored in advance in the control device, and the predetermined rotational speed and the predetermined period of time are determined by the method as following: detecting pressure difference on two sides of the proportional or switching valve, and then continuously adjusting the lifting mechanism to determine values of increased pressure in the hydraulic line connected to the lower end of the proportional valve or switch valve when the hydraulic pump operates at different speeds for a predetermined period of time, thus determining the predetermined rotational speed and the predetermined period of time of operation of the hydraulic pump.

In an embodiment, the proportional valve or switch valve is provided in a hydraulic line between the hydraulic pump and the hydraulic cylinder in a position adjacent to the hydraulic cylinder.

In an embodiment, the lowering mode includes a non-energy-regeneration mode. When the proportional valve or switch valve is a proportional valve, in the energy-regeneration mode, the descending speed of the work platform is controlled by the electric machine; in the non-energy-regeneration mode, a maximum of the descending speed of the work platform is set by an opening degree of the proportional valve or switch valve.

In an embodiment, the lowering mode further includes a non-energy-regeneration mode, and the lifting mechanism further includes a flow limiting valve which is provided between the hydraulic cylinder and the proportional valve or switch valve, for limiting a maximum of a descending speed of the work platform.

In the present application, the flow limiting valve is used to provide throttling resistance to limit the maximum of the descending speed of the hydraulic fluid, thus in turn defining the maximum of the descending speed of the work platform such that the safety of the lifting mechanism is ensured.

In an embodiment, the flow limiting valve is provided adjacent to an outlet of the hydraulic cylinder.

In the present application, by providing the flow limiting valve at the outlet of the hydraulic cylinder, it is possible to ensure that in case of breaking in any position of the whole hydraulic line of the lifting mechanism, the work platform may descend smoothly and stably, and thus the safety of the lifting mechanism may be ensured.

In an embodiment, the flow limiting valve has a throttling resistance in a second position larger than that in a first position. When a pressure difference across the flow limiting valve is larger than a predetermined pressure difference, the flow limiting valve switches from the first position to the second position.

The position of the flow limiting valve is controlled by the pressure difference across the flow limiting valve. The flow limiting valve, by switching between the first position and the second position of the flow limiting valve, adjusts the maximum of the descending speed of the hydraulic fluid, thus in turn adjusting the descending speed of the work platform.

In an embodiment, in the energy-regeneration mode, the flow limiting valve is in the first position, and in the non-energy-regeneration mode, the flow limiting valve is in the second position.

In the energy-regeneration mode, the pressure difference across the flow limiting valve is less than a predetermined pressure difference; in the non-energy-regeneration mode, the pressure difference across the flow limiting valve is larger than the predetermined pressure difference. In the present application, as the flow limiting valve includes a first orifice having a fixed size, the pressure difference across the flow limiting valve is in positive correlation to a flow passing through the flow limiting valve. Therefore, it is possible to switch the position of the flow limiting valve when the pressure difference (or flow) between two sides of the flow limiting valve is abnormal, ensuring smooth and stable descending of the work platform.

In the energy-regeneration mode, it is necessary to convert the potential energy of the hydraulic fluid into kinetic energy of the electric machine and then into electric energy. Therefore, it is necessary to have a relatively low throttling resistance between the hydraulic fluid in the hydraulic cylinder and the hydraulic line, to facilitate conversion from the potential energy of the hydraulic fluid into kinetic energy to drive running of the electric machine. In the non-energy-regeneration mode, the potential energy is consumed at the orifice and converted into thermal energy, and the hydraulic fluid flows slowly to the oil tank at a constant rate, to ensure smooth and stable descending of the work platform. Therefore, if there is no failure in the lifting mechanism, in the energy-regeneration mode, the flow limiting valve is in the first position with low throttling resistance, while in the non-energy-regeneration mode, the flow limiting valve is in the second position with high throttling resistance.

In an embodiment, the flow limiting valve includes a first orifice and a selection valve connected with each other. The selection valve having a communicating position and a throttling position in which a second orifice takes effect; when the selection valve is in the communicating position, the flow limiting valve is in the first position; when the selection valve is in the throttling position, the flow limiting valve is in the second position.

In an embodiment, the second orifice has a size less than that of the first orifice.

When the pressure difference across the flow limiting valve is larger than a predetermined pressure difference, the selection valve switches from the communicating position to the throttling position, i.e. switching from the first orifice to the second orifice, thus limiting the descending speed of the work platform by the second orifice.

In an embodiment, in the energy-regeneration mode, the descending speed of the work platform is controlled by the electric machine; in the non-energy-regeneration mode, the maximum of the descending speed of the work platform is set by the second orifice.

In an embodiment, the selection valve further includes a spring. When the pressure difference across the flow limiting valve is less than a predetermined pressure difference set by the spring, the selection valve is in the communicating position; when the pressure difference across the flow limiting valve is larger than the predetermined pressure difference set by the spring, the selection valve is in the throttling position.

In an embodiment, the flow limiting valve includes a proportional valve for continuously adjusting a flow resistance In an embodiment, the proportional valve has a maximum permissible opening degree which is set according to pre-calibrated data and in terms of a real-time pressure of the hydraulic cylinder correspondingly, or is directly set according to a maximum pressure of the hydraulic cylinder permitted by the work platform.

In an embodiment, the lowering mode includes the non-energy-regeneration mode. The lifting mechanism further includes a throttle valve. In the energy-regeneration mode, the descending speed of the work platform is controlled by the electric machine; in the non-energy-regeneration mode, the descending speed of the work platform is set by a size of an orifice of the throttle valve; in an abnormal descending of the work platform, the maximum of the descending speed of the work platform is set by the flow limiting valve.

In the non-energy-regeneration mode, it is possible to use the throttle valve to control the descending speed of the hydraulic fluid. The flow limiting valve, in normal operation cases (including the lifting mode, the hold mode, the energy-regeneration mode and the non-energy-regeneration mode), is always in the communicating position, and switches to the throttling position only in abnormal cases, such as the hydraulic line being broken. By such configuration, it is possible to reduce the frequency of switching of the flow limiting valve and reduce the time duration for which the flow limiting valve is in the throttling position such that the service life of the flow limiting valve may be longer and the safety of the whole lifting mechanism is ensured. Compared with the flow limiting valve, the throttle valve is low in cost and is easy to replace and it is possible to reduce the cost by providing the throttle valve between the reversing valve and the oil tank.

In an embodiment, the lifting mechanism further includes a throttle valve. In the energy-regeneration mode or the non-energy-regeneration mode, the flow limiting valve is in the first position, and in an abnormal descending of the work platform, the flow limiting valve is in the second position.

In an embodiment, the lifting mechanism further includes a reversing valve which performs switching between the energy-regeneration mode and the non-energy-regeneration mode by selectively connecting the hydraulic cylinder to the hydraulic pump or the oil tank, and the throttle valve is provided between the reversing valve and the oil tank.

In the present application, in the energy-regeneration mode, the hydraulic cylinder is communicated with the hydraulic pump, and in the non-energy-regeneration mode, the hydraulic cylinder is communicated with the oil tank.

In an embodiment, the lifting mechanism further includes a control device. The control device is configured to switch a position of the reversing valve under a predetermined condition, such that the hydraulic cylinder is switched from being connected with the hydraulic pump to being connected with the oil tank, to switch from the energy-regeneration mode to the non-energy-regeneration mode.

In an embodiment, the predetermined condition includes any one of following: state-of-charge of the battery being higher than a predetermined value, failure of the battery, failure of the electric machine, and other system failures.

In an embodiment, the lifting mechanism further includes a steering device, and the reversing valve connects one of the hydraulic pump and the oil tank to the steering device and connects the other of the hydraulic pump and the oil tank to the hydraulic cylinder.

In an embodiment, the lifting mechanism includes two or more hydraulic cylinders, a corresponding flow limiting valve is provided adjacent to an outlet of each hydraulic cylinder, and each flow limiting valve is connected to the proportional valve or switch valve.

In the present application, the lifting mechanism including two or more hydraulic cylinders may improve the maximum load value of the lifting mechanism.

In an embodiment, each flow limiting valve is connected to the proportional valve or switch valve, and the lifting mechanism further includes an overflow valve provided in parallel to the proportional valve or switch valve.

In an embodiment, the lifting mechanism is a scissor lift or a forklift.

In the present application, a lifting mechanism is provided. In the energy-regeneration mode, the hydraulic fluid drives the hydraulic pump to operate as the hydraulic motor, thus in turn driving the electric machine to operate as the generator and charge the battery. In the non-energy-regeneration mode, the flow limiting valve limits the maximum of the descending speed of the work platform. In the present application, the hydraulic pump operates to increase the pressure in the hydraulic line between the hydraulic pump and the proportional valve or switch valve before the proportional valve or switch valve is switched from the unidirectional communication position to the bidirectional communication position. By increasing the pressure in the hydraulic line, an accelerated drop of the hydraulic fluid, when the proportional valve or switch valve is switched from the unidirectional communication position to the bidirectional communication position due to an excessive pressure difference across the proportional valve or switch valve may be avoided. Therefore, a sudden drop of the work platform is avoided, and a safety performance of the lifting mechanism is improved.

DETAILED DESCRIPTION

Figure 1:
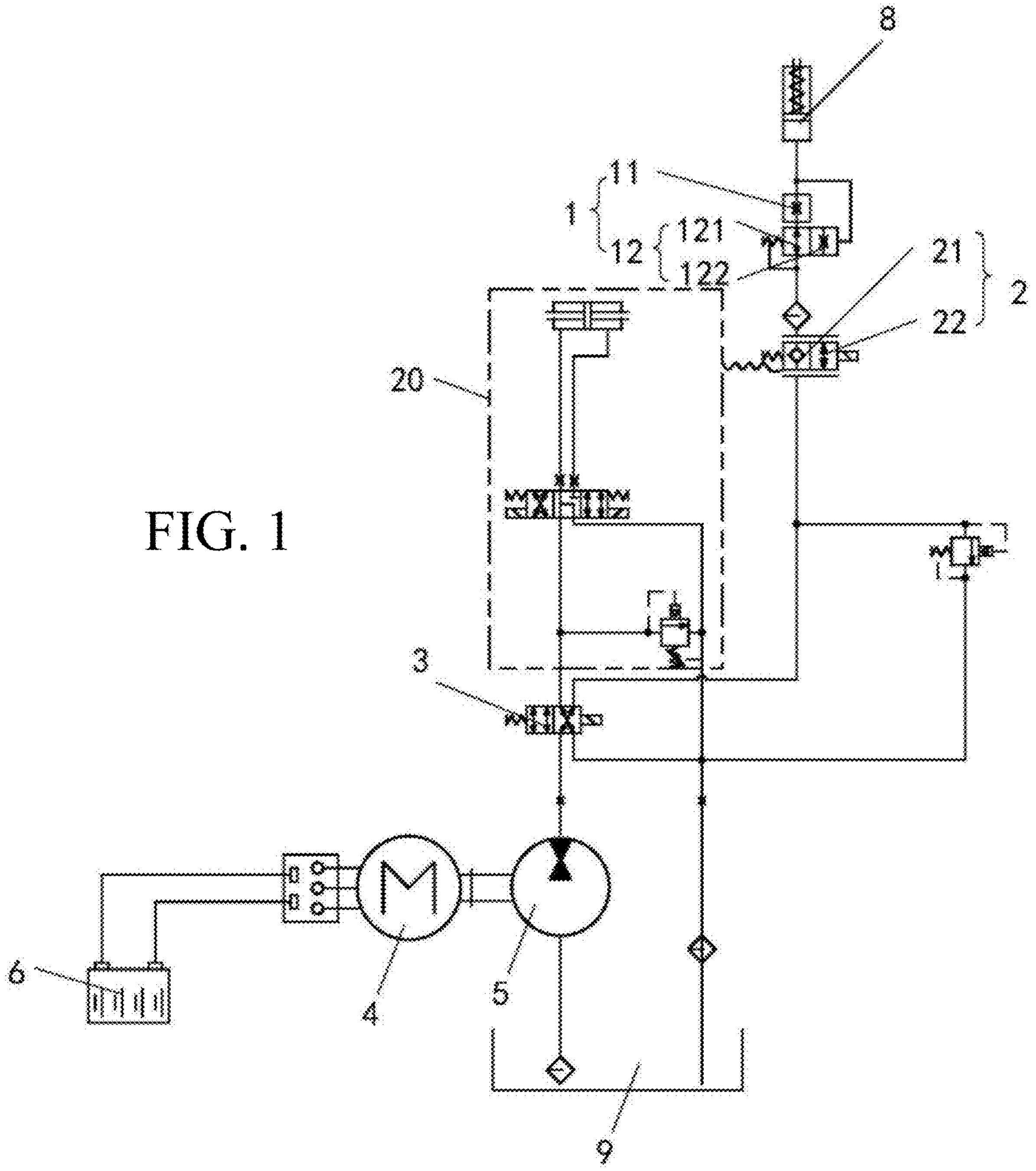
FIG. 1 is a hydraulic schematic diagram of a lifting mechanism as provided in an embodiment of the present application.

Hereinafter, the technical solutions in the embodiments of the present application will be described clearly and completely in combination with the accompanying drawings in the embodiments of the present application. Certainly, the described embodiments are only some of the embodiments of the present application, rather than all the embodiments. Based on the embodiments in the present application, any other embodiments obtained, without any inventive work, by those skilled in the art will fall within the protection scope of the present application.

Generally, a lifting mechanism has a lifting mode, a hold mode and a lowering mode. In the lifting mode, the work platform moves upward under the effect of a hydraulic cylinder; in the hold mode, and the work platform is substantially stationary. In the lowering mode, the work platform moves downward. The lifting mechanism controls the height of the work platform by switching between different modes, so as to transport cargo(es) or person(s) carried by the work platform from high to low, or vise versa.

As a battery of the lifting mechanism has a limited capacity, the lifting mechanism thus may not meet the service need of all day running. Therefore, it is necessary to charge it in a workday, thus limiting the working time duration of the lifting mechanism during a workday. In order to improve the utilization of an electrically driven lifting mechanism, a lifting mechanism is required to operate without charging the battery during the workday and then charge the battery overnight. For this, the lowering mode of the lifting mechanism of an embodiment of the present application includes an energy-regeneration mode in which the potential energy that the work platform of the lifting mechanism has in descending is converted into electric energy to extend the service life of the battery.

However, the lifting mechanism having the energy-regeneration mode still has a safety hazard during a process of use. In a hold mode, a pressure of a hydraulic line between a hydraulic cylinder and a proportional valve or switch valve is relatively too high, the proportional valve or switch valve is connected to the hydraulic pump by a hydraulic line, a length of the line between the proportional valve or switch valve and the hydraulic pump is relatively long, and the pressure of the hydraulic line between the proportional valve or switch valve and the hydraulic pump is relatively low. When the lifting mechanism is switched from the energy-regeneration mode to the non-energy-regeneration mode, the proportional valve or switch valve is switched from the unidirectional communication position to the bidirectional communication position, and a high pressure hydraulic line at one side of the proportional valve or switch valve is communicated with a low pressure hydraulic line at the other side of the proportional valve or switch valve. Thus the pressure of the low pressure hydraulic line is instantaneously increased, the hydraulic fluid in the low pressure hydraulic line is compressed, and the work platform descends suddenly, leading to some safety problems such as that people on the work platform fall down or goods on the work platform are damaged.

In view of this, an embodiment of the present application provides a lifting mechanism which at least solves the safety problem caused by a sudden drop of the work platform when the proportional or switch valve is switched from the unidirectional communication position to the bidirectional communication position.

It should be understood that the lifting mechanism in the present application may be a mechanical apparatus for lifting, used for carrying cargoes or persons working aloft or the like, and may be an aerial working platform or a forklift, etc. for example. In an embodiment of the present application, the lifting mechanism to be explained may be an aerial working platform as an example, and specifically, the lifting mechanism is a scissor lift.

FIG. 1 is a hydraulic schematic diagram of a lifting mechanism as provided in an embodiment of the present application. As shown in FIG. 1, the lifting mechanism may include a steering system and a lifting system. The embodiments of the present application mainly solve the safety problem due to descending too fast of the work platform of the lifting mechanism. In order to better set forth the technical problem to be solved by the present application, FIG. 1 emphasizes a hydraulic line in the lifting system while the structures of a driving system and the steering system are partially omitted.

As shown in FIG. 1, the lifting mechanism of an embodiment of the present application includes a proportional valve or switch valve 2, a reversing valve 3, an electric machine 4, a hydraulic pump 5, a battery 6, a hydraulic cylinder 8, an oil tank 9, and a work platform (not shown). The hydraulic cylinder 8, the proportional valve or switch valve 2, the reversing valve 3, the hydraulic pump 5 and the oil tank 9 are connected in sequence by the hydraulic line. The lifting mechanism further includes a steering device 20 which is connected via the reversing valve 3 to the hydraulic pump 5 or the oil tank 9.

The lifting mechanism of an embodiment of the present application includes a lifting mode, a hold mode and a lowering mode. The lowering mode includes two modes: an energy-regeneration mode and a non-energy-regeneration mode.

Optionally, as another embodiment, the lifting mechanism may further include a flow limiting valve 1 provided between the hydraulic cylinder 8 and the proportional valve or switch valve 2. The flow limiting valve 1 is used to provide throttling resistance, so as to adjust a maximum flow rate of the hydraulic fluid in the hydraulic line. The flow limiting valve 1 has a throttling resistance in a second position larger than that in a first position.

The proportional valve or switch valve 2 includes a unidirectional communication position 21 in which the hydraulic fluid is permitted to flow from the hydraulic pump 5 to the flow limiting valve 1 in a unidirectional way, and a bidirectional communication position 22. For example, the proportional valve or switch valve 2 is a two-position-two-way valve.

The reversing valve 3 performs switching between the energy-regeneration mode and the non-energy-regeneration mode by selectively connecting the hydraulic cylinder 8 to the hydraulic pump 5 or the oil tank 9. For example, the reversing valve 3 is a two-position-four-way valve, connecting one of the hydraulic pump 5 and the oil tank 9 to the steering device 20 and connecting the other of the hydraulic pump and the oil tank to the hydraulic cylinder 8.

In the lifting mode, the flow limiting valve 1 is in the first position, the proportional valve or switch valve 2 is in the unidirectional communication position 21 in which the hydraulic fluid is permitted to flow from the hydraulic pump 5 to the flow limiting valve 1 in a unidirectional way, and the reversing valve 3 is in a position in which the hydraulic pump 5 is communicated with the hydraulic cylinder 8. The oil tank 9, the hydraulic pump 5, the reversing valve 3, the proportional valve or switch valve 2, the flow limiting valve 1 and the hydraulic cylinder 8 are communicated in sequence by the hydraulic line. The hydraulic fluid in the oil tank 9, with the effect of the hydraulic pump 5, enters the hydraulic cylinder 8, pushing a telescopic rod in the hydraulic cylinder 8 to move upwards so as to raise the work platform.

In the hold mode, the flow limiting valve 1 and the proportional valve or switch valve 2 are in the same positions as those in the lifting mode. The reversing valve 3 is in a positon connecting the hydraulic pump 5 with the hydraulic cylinder 8, or the reversing valve 3 is in a positon connecting the oil tank 9 with the hydraulic cylinder 8, the hydraulic pump 5 stops working, and the work platform is kept at a certain height.

In the energy-regeneration mode in the lowering mode, the flow limiting valve 1 is in the first position with low flow resistance, the proportional valve or switch valve 2 is in the bidirectional communication position 22, and the reversing valve 3 is in the position in which the hydraulic pump 5 is communicated with the hydraulic cylinder 8. The hydraulic cylinder 8, the flow limiting valve 1, the proportional valve or switch valve 2, the reversing valve 3, the hydraulic pump 5 and the oil tank 9 are communicated in sequence by the hydraulic line. The hydraulic fluid in the hydraulic cylinder 8 passes in sequence through the flow limiting valve 1, the proportional valve or switch valve 2 and the reversing valve 3, drives the hydraulic pump 5 to operate as a hydraulic motor, and then flows into the oil tank 9, in turn driving the electric machine 4 to operate as a generator and charge the battery 6. The rotation speed of the electric machine 4 is controlled to control the rotation speed of the hydraulic pump 5, thus in turn controlling the flow rate of the hydraulic fluid and the descending speed of the work platform. In short, the descending speed of the lifting mechanism is controlled by the electric machine 4. For a traditional orifice having a fixed size, the maximum of the descending speed is set in terms of a maximum load, and it is inevitable for the descending speed of the work platform to be too slow when it is not loaded or is not fully loaded. In contrast, by controlling the descending speed of the work platform by the electric machine 4, it may be ensured that it may be descended at a maximum permissible safe speed no matter when it is fully loaded or is not loaded/not fully loaded. The descending speed may be adjusted more freely, improving the operation efficiency in a maximum degree.

In the non-energy-regeneration mode in the lowering mode, the flow limiting valve 1 is in the second position with high flow resistance, the proportional valve or switch valve 2 is in the bidirectional communication position 22, and the reversing valve 3 is in the position in which the oil tank 9 is communicated with the hydraulic cylinder 8. The hydraulic cylinder 8, the flow limiting valve 1, the proportional valve or switch valve 2, the reversing valve 3 and the oil tank 9 are communicated in sequence by the hydraulic line. The hydraulic fluid in the hydraulic cylinder 8 passes through the flow limiting valve 1, the proportional valve or switch valve 2 and the reversing valve 3 in sequence, and then flows into the oil tank 9.

The hydraulic pump 5 may operate as a hydraulic motor. In the lifting mode, the hydraulic pump 5 rotates forward to pump the hydraulic fluid from the oil tank 9 into the hydraulic cylinder 8, thus in turn pushing a telescopic rod of the hydraulic cylinder 8 to move upwards so as to raise the work platform. In the energy-regeneration mode of the lowering mode, the hydraulic pump 5 is rotated reversely, with the effect of the potential energy of the hydraulic fluid, to drive the electric machine 4 to operate as a generator for generating electricity.

The battery 6 may be a Li-ion battery. On one hand, the battery 6 provides electric energy to the lifting mechanism. For example, in the lifting mode, it provides electric energy for driving the electric machine 4 to operate. On the other hand, in the energy-regeneration mode, the battery 6 is charged to store the electric energy generated by the electric machine 4 (operating as a generator at this time).

Figure 2:
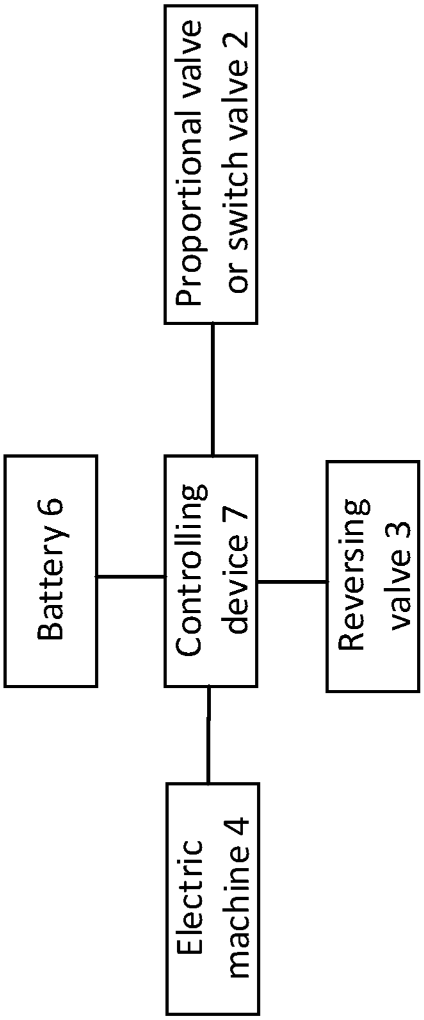
FIG. 2 is a circuit schematic diagram of a lifting mechanism as provided in an embodiment of the present application.

FIG. 2 is a circuit schematic diagram of a lifting mechanism as provided in an embodiment of the present application. As shown in FIGS. 1 and 2, the lifting mechanism includes a control device 7 which is electrically connected with the battery 6, the electric machine 4, the reversing valve 3 and the proportional valve or switch valve 2.

The control device 7 may include one or more controllers, such as a motor controller, a valve controller, or a main controller which determines motor rotation speed/direction and a position of valve according to the operator input and the controlling logic, as long as these functions may be achieved.

As shown in FIGS. 1 and 2, the control device 7 is configured to enter the lifting mode in response to receiving a lifting command. Therefore, the lifting mechanism switches from the hold mode or the lowering mode to the lifting mode. Specifically, the control device 7, in response to receiving a lifting command, controls the proportional valve or switch valve 2 to switch to the unidirectional communication position 21, controls the reversing valve 3 to a state in which the hydraulic cylinder 8 is connected with the hydraulic pump 5, and controls the electric machine 4 to drive running of the hydraulic pump 5, to pump the hydraulic fluid from the oil tank 9 into the hydraulic cylinder 8, thus in turn pushing a telescopic rod in the hydraulic cylinder 8 to move upward to raise the work platform which is connected directly or indirectly with the telescopic rod.

The control device 7 is further configured to, in response to receiving a lowering command, switch the proportional valve or switch valve 2 to the bidirectional communication position 22. Therefore, the lifting mechanism switches from the hold mode to the lowering mode.

The control device 7 is further configured to, in response to receiving a lowering command, increase the pressure in the hydraulic line and then switch to the lowering mode. In the hold mode, the pressure between the hydraulic cylinder 8 and the proportional valve or switch valve 2 is relatively high, and the pressure of line between the proportional valve or switch valve 2 and the hydraulic pump 8 is relatively low. Thus, when it is switched from the hold mode to the lowering mode, if the line pressure between the proportional valve or switch valve 2 and the hydraulic pump 8 is not increased in advance, at the moment when the proportional valve or switch valve 2 is switched to the bidirectional communication position 22, the oil with high pressure on the upper side will be communicated with the line with low pressure on the lower side such that the pressure in the line with low pressure on the lower side is increased instantly, compressing the hydraulic fluid in the line with low pressure, such that the work platform descends suddenly, a sense of falling is felt by a user on the work platform, and thus it affects the experience of use.

Specifically, increasing the pressure in the hydraulic line may be increasing the pressure in the hydraulic line between the hydraulic pump 5 and the proportional valve or switch valve 2, such that the pressure difference between the pressure of the hydraulic line (between the hydraulic pump 5 and the proportional valve or switch valve 2) and the pressure in the hydraulic cylinder 8 is less than a predetermined value, or such that the pressure in the hydraulic line (between the hydraulic pump 5 and the proportional valve or switch valve 2) is same or substantially same as the pressure in the hydraulic cylinder 8. The predetermined value may be determined according to several factors, such as the precision of the lifting mechanism. Thus, at the moment when the proportional valve or switch valve 2 is switched from the unidirectional communication position 21 to the bidirectional communication position 22, the accelerated descent of the hydraulic fluid due to an excessive pressure difference across the proportional valve or switch valve 2 may be avoided, and in turn it may be ensured that the work platform after being switched to the lowering mode, descends smoothly and stably.

Specifically, when receiving a lowering command, the control device 7 controls operation of the hydraulic pump 5 to increase the pressure in the hydraulic line. When the pressure difference between the hydraulic cylinder 8 and the hydraulic line is less than a predetermined value or when the hydraulic pump 5 has run for a predetermined period of time, the control device 7 controls the proportional valve or switch valve 2 to switch to the bidirectional communication position 22 such that the lifting mechanism is switched to the lowering mode.

For example, the control device 7 controls the proportional valve or switch valve 2 to switch from the unidirectional communication position 21 to the bidirectional communication position 22 after it receives a lowering command and after the hydraulic pump has run for a predetermined period of time.

For example, the control device 7 switches from the unidirectional communication position 21 to the bidirectional communication position 22 after it receives a lowering command and when the pressure difference between upper and lower ends of the proportional valve or switch valve 2 is less than a predetermined value or equal to zero.

The control device 7 is configured to, under a predetermined condition, switch the position of the reversing valve 3 such that the hydraulic cylinder 8 is switched from connection with the hydraulic pump 5 to connection with the oil tank 9, so as to switch from the energy-regeneration mode to the non-energy-regeneration mode. That is, according to whether to perform energy recycling by the lifting mechanism, the position of the reversing valve 3 is switched. Specifically, the predetermined condition includes any one of state-of-charge of the battery 6 being higher than a predetermined value, failure of the battery 6, failure of the electric machine 4, and other system line failures. Also, the predetermined condition may be receiving a controlling command from the operator to facilitate manipulation of the work platform by the operator according to the requirements.

For example, when the state-of-charge of the battery 6 is higher than 80%, the control device 7 controls the lifting mechanism to switch from the energy-regeneration mode to the non-energy-regeneration mode. Specifically, when the state-of-charge of the battery 6 is higher than a predetermined value, charging the battery 6 will cause overheating of the battery 6, thus shortening the life thereof. Therefore, when the state-of-charge of the battery 6 is higher than a predetermined value, switching to the non-energy-regeneration mode may extend the service life of the battery 6, reducing use cost of the lifting mechanism.

For example, when the electric machine 4 fails, the control device 7 controls the lifting mechanism to switch from the energy-regeneration mode to the non-energy-regeneration mode. Specifically, in the case of failure of the electric machine 4, the electric machine 4 may not be used to control the descending speed of the hydraulic fluid so as to control the descending speed of the work platform. Therefore, when the electric machine 4 fails, switching to the non-energy-regeneration mode may ensure smooth and stable descending of the work platform.

In an embodiment, the control device 7 is configured to, according to an input command from the user, switch from the energy-regeneration mode to the non-energy-regeneration mode.

The control device 7 is further configured to, in the energy-regeneration mode, control the resistance of the electric machine 4 so as to control the descending speed of the hydraulic fluid.

As shown in FIGS. 1, the flow limiting valve 1 is used to provide throttling resistance for limiting the maximum of the descending speed of the hydraulic fluid, thus in turn defining the maximum of the descending speed of the work platform. Specifically, the flow limiting valve 1 includes two states: a first position and a second position. The flow limiting valve 1 has a throttling resistance in the second position larger than that in the first position. When a pressure difference across the flow limiting valve 1 is larger than a predetermined pressure difference, the flow limiting valve 1 switches from the first position to the second position. Therefore, the maximum of the descending speed of the hydraulic fluid is adjusted by switching the flow limiting valve 1 between the first position and the second position, thus in turn adjusting the descending speed of the work platform.

Further, the position of the flow limiting valve 1 is adjusted according to the pressure difference across the flow limiting valve 1. Normally, in the energy-regeneration mode, the pressure difference across the flow limiting valve 1 is less than the predetermined pressure difference, and the flow limiting valve 1 is in the first position; in the non-energy-regeneration mode, the pressure difference across the flow limiting valve 1 is larger than the predetermined pressure difference, and the flow limiting valve 1 is in the second position.

In a special case, for example, when a downstream hydraulic flexible hose is broken, the flow of the hydraulic oil from the hydraulic cylinder 8 suddenly increases such that the pressure difference across the flow limiting valve 1 becomes abnormal, and when the pressure difference across the flow limiting valve 1 is larger than the predetermined pressure difference, the flow limiting valve 1 switches to the second position with higher throttling resistance to limit the flow rate of the hydraulic fluid, and the accelerated descent of the work platform in the special case may be avoided.

The flow limiting valve 1 of an embodiment of the present application is provided adjacent to an outlet of the hydraulic cylinder 8, which may improve stability of the lifting mechanism. Specifically, if the flow limiting valve 1 and the hydraulic cylinder 8 are connected via the hydraulic line therebetween, when such portion of the hydraulic line is broken, the flow limiting valve 1 may not take effect, that is, it may not limit the accelerated descent of the work platform, thus threatening safety of personal on the work platform. Therefore, in the present application, by providing the flow limiting valve 1 at the outlet of the hydraulic cylinder 8, it may be ensured that even if any portion of the hydraulic line of the whole system is broken, the flow limiting valve 1 may take effect such that the work platform may descend smoothly, and thus the safety of the lifting mechanism may be ensured.

In the energy-regeneration mode, it is necessary to convert potential energy of the hydraulic fluid into kinetic energy of the electric machine 4 and then into electric energy. Therefore, it is necessary to have a relatively low throttling resistance between the hydraulic fluid in the hydraulic cylinder 8 and the hydraulic line, to facilitate conversion of potential energy of the hydraulic fluid into kinetic energy to drive running of the electric machine 4. In the non-energy-regeneration mode, the potential energy is consumed at the orifice and converted into thermal energy, and the hydraulic fluid flows slowly at a constant rate to the oil tank 9 to ensure smooth and stable descending of the work platform. Therefore, if there is no failure in the lifting mechanism, in the energy-regeneration mode, the flow limiting valve 1 is in the first position with low throttling resistance, while in the non-energy-regeneration mode, the flow limiting valve 1 is in the second position with high throttling resistance.

In an embodiment of the present application, the flow limiting valve 1 includes a first orifice 11 and a selection valve 12 connected with each other. The selection valve 12 includes a second orifice 121 having a size less than that of the first orifice 11. The flow limiting valve 1 has a communicating position and a throttling position in which the second orifice 121 takes effect. The flow limiting valve 1 has a throttling resistance in the communicating position lower than that in the throttling position. When the flow limiting valve 1 is in the first position, the selection valve 12 is in the communicating position, and when the flow limiting valve 1 is in the second position, the selection valve 12 is in the throttling position. The maximum flow rate of the hydraulic fluid is defined by the second orifice 121. That is, the maximum of the descending speed of the work platform is defined by the second orifice 121. The safety performance of the lifting mechanism may be ensured.

In an embodiment of the present application, the selection valve 12 further includes a spring 122. When the pressure difference across the flow limiting valve 1 is less than a predetermined pressure difference set by the spring 122, the selection valve 12 is in the communicating position; when the pressure difference across the flow limiting valve 1 is larger than the predetermined pressure difference set by the spring 122, the selection valve 12 is in the throttling position. Specifically, a branch between the first orifice 11 and the outlet of the hydraulic cylinder 8 is communicated with a side of the selection valve 12 away from the spring 122, and the side of the flow limiting valve 1 away from the hydraulic cylinder is communicated via the branch with the side of the selection valve 12 where the spring 122 is provided. When the pressure difference across the flow limiting valve 1 is too large, the pressure difference of the hydraulic fluid across the selection valve 12 is larger than the spring force of the spring 122 connected to the first side of the selection valve 12, thus in turn compressing the spring 122 such that the selection valve 12 is switched from the communicating position to the throttling position.

By using the flow limiting valve 1 of hydraulic feedback type to limit the maximum of the descending speed of the work platform, possible failures in solutions including an electric control valve and a sensor, such as electric power failure or sensor failure, may be avoided, resulting in a higher safety level and a longer life.

Though the flow limiting valve 1 in the present embodiment includes the first orifice 11 and the selection valve 12 by which the automatic switching may be achieved with a relatively low cost in response to the pressure difference, it is also possible to use a proportional valve as the flow limiting valve 1 as long as it has the communicating position and the throttling position. When a proportional valve is used, it may continuously adjust the throttling resistance, and in turn may continuously adjust the maximum of the descending speed of the work platform, and the controlling precision may be improved. When the flow limiting valve 1 is a proportional valve, it is possible to control its valve element position according to a pressure in the hydraulic cylinder 8 as detected by a pressure sensor. Specifically, it is possible to use a calibration method to set a maximum permissible opening degree of the proportional valve, thus limiting the maximum of the descending speed under such pressure. If the work platform (platform, which corresponds to the pressure of the hydraulic cylinder) is heavy, the maximum permissible opening degree of the proportional valve is relatively small; if the platform is light, the maximum permissible opening degree of the proportional valve is relatively large. Certainly, it is also possible to directly set the maximum permissible opening degree of the proportional valve according to a maximum bearing weight permitted by the platform, without any calibration.

It may be understood that the high or low throttling resistance as mentioned in the present application is a relative expression, rather than defining the specific resistance range thereof, as long as the throttling resistance in the second position is larger than the throttling resistance (which may be zero) in the first position.

It should be understood that the proportional valve or switch valve 2 may be any one of proportional valves, or switch valves.

In an embodiment, when the proportional valve or switch valve 2 is a proportional valve, it not only may be switched to the unidirectional communication position 21 (i.e. the proportional valve has a minimum opening degree) or the bidirectional communication position 22 (i.e. the proportional valve has a maximum opening degree), but also may adjust the throttling resistance by adjusting the opening degree of the proportional valve, thus in turn adjusting the descending speed of the work platform. Thus, the controlling precision may be improved.

Specifically, in the energy-regeneration mode of the lowering mode, the proportional valve or switch valve 2 is in the bidirectional communication position 22 and the descending speed of the work platform is controlled by the electric machine 4; in the non-energy-regeneration mode of the lowering mode, the descending speed of the work platform may be set by the opening degree of the proportional valve or switch valve 2; in an abnormal descending of the work platform, the maximum of the descending speed of the work platform is set by the flow limiting valve 1.

When the proportional valve or switch valve 2 is a proportional valve, even if a line between the proportional valve or switch valve 2 and the oil tank 9 is broken, the proportional valve or switch valve 2 may control the descending speed of the work platform. If a hydraulic line between the proportional valve or switch valve 2 and the flow limiting valve 1 is broken, the proportional valve or switch valve 2 may not control the descending speed of the work platform, and the flow limiting valve 1 controls the throttling resistance and in turn controls the descending speed of the work platform.

Figure 3:
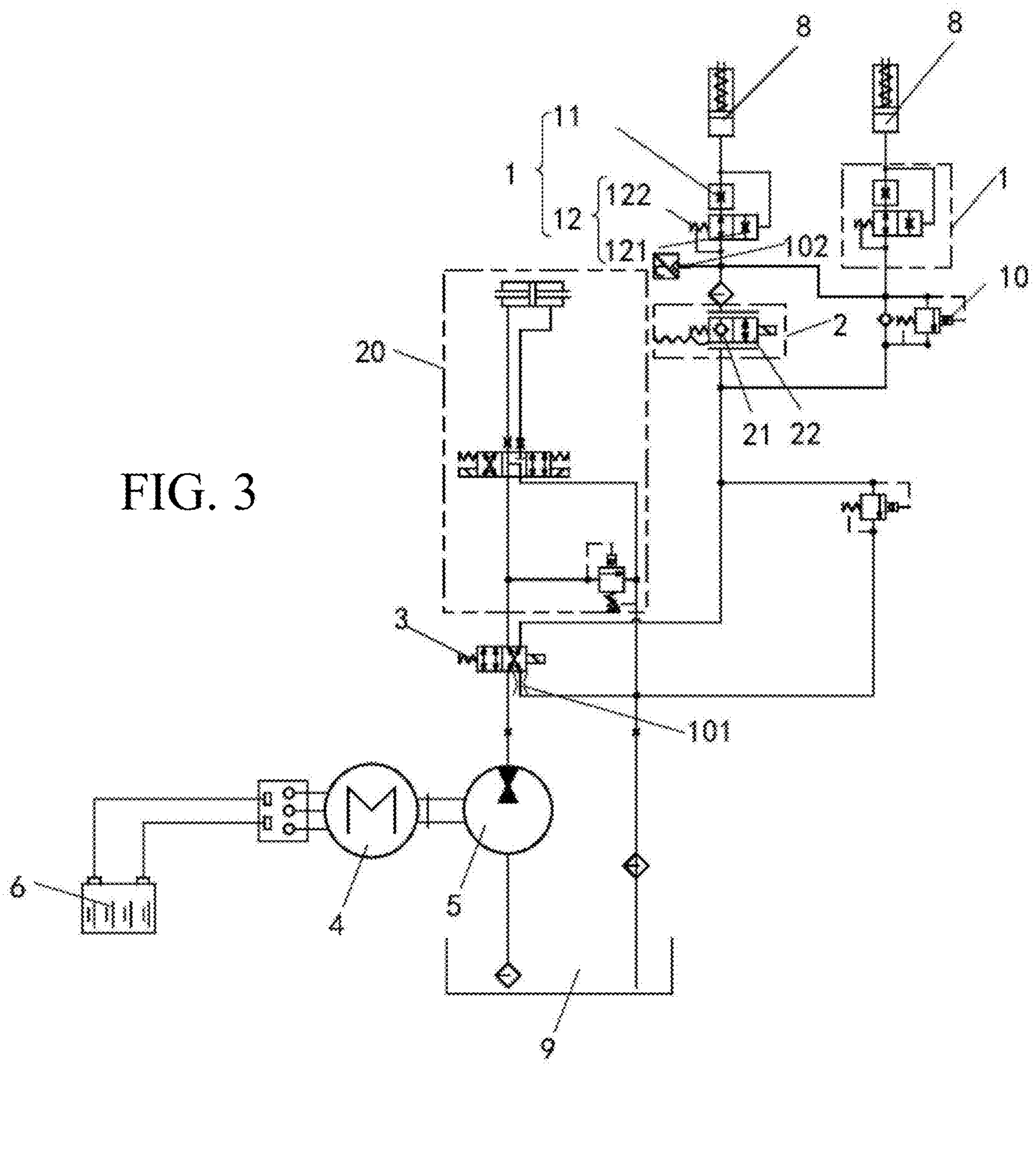
FIG. 3 is a hydraulic schematic diagram of a lifting mechanism as provided in an embodiment of the present application.

FIG. 3 is a hydraulic schematic diagram of a lifting mechanism as provided in an embodiment of the present application. As shown in FIG. 3, the present embodiment differs from the previous embodiment in that the lifting mechanism of the present embodiment further includes a throttle valve 101 provided between the reversing valve 3 and the oil tank 9.

The specific position of the throttle valve 101 may be freely adjusted between the reversing valve 3 and the oil tank 9. For example, as shown in FIG. 3, the throttle valve 101 is disposed on the hydraulic line adjacent to a lower end of the reversing valve 3. The throttle valve 101 has a hole with a size less than that of the second orifice 121. The throttle valve 101 may be a simple valve having an orifice, or may be any valve providing throttling function (such as a proportional valve). Specifically, it differs from the first embodiment in that in the non-energy-regeneration mode, it is possible to use the throttle valve 101 (rather than the flow limiting valve 1) to control the descending speed of the hydraulic fluid. The flow limiting valve 1, in normal operation cases (including the lifting mode, the hold mode, the energy-regeneration mode and the non-energy-regeneration mode), is always in the communicating position, and is switched to the throttling position only in abnormal cases, such as the hydraulic line being broken. By such configuration, it is possible to reduce the frequency of switching of the flow limiting valve 1 and reduce the time duration in which the flow limiting valve 1 is in the throttling position such that the service life of the flow limiting valve 1 may be longer and the safety of the whole lifting mechanism is ensured. Compared with the flow limiting valve 1, the throttle valve 101 is low in cost and is easy to be replaced, and it is possible to reduce the cost by providing the throttle valve 101 between the reversing valve 3 and the oil tank 9. In the lifting mode, the hold mode and the energy-regeneration mode, the hydraulic fluid does not pass through the hydraulic line between the reversing valve 3 and the oil tank 9, and the throttle valve 101 provided between the reversing valve 3 and the oil tank 9 will not affect normal flowing of the hydraulic fluid in the lifting mode, the hold mode and the energy-regeneration mode of the lifting mechanism.

The present embodiment shows two hydraulic cylinders 8, and a corresponding flow limiting valve 1 is provided adjacent to the outlet of each hydraulic cylinder 8. The provided two hydraulic cylinders 8 may improve the maximum load of the lifting mechanism. The number and model of the hydraulic cylinders 8 may be adaptively adjusted according to the specific application circumstances of the lifting mechanism.

In addition, an overflow valve 10 is provided in parallel to the proportional valve or switch valve 2.

It should be understood that the lifting mechanism may be adaptively adjusted according to the requirements and based on the principle of the embodiment(s) of the present application. It is possible to remove or add some part(s) in the lifting mechanism. It is also possible to adjust the model(s) of the various parts in the lifting mechanism according to the requirements. In an embodiment, the steering system and the lifting system are controlled individually, rather than being switched by the reversing valve 3. In another embodiment, it is possible to add a detection component, such as a pressure sensor 102 and a speed sensor, in the lifting mechanism, and it is also possible to use a plurality of hydraulic cylinders 8 to improve the maximum load of the lifting mechanism.

It may be understood from the above disclosure as well as figures and claims that compared with the prior art, the lifting mechanism according to the embodiment(s) of the present application has many possibilities and advantages. It will be further appreciated by those skilled in the art that further modifications and changes may be made to the lifting mechanism according to the present application, without departing from the spirit and scope of the present application. Therefore, such modifications and changes will fall within the claims and be covered by the claims. It should be further understood that the above examples and embodiments are provided for illustrative purpose only, and various modifications, changes or combinations of the embodiments as suggested by those skilled in the art should be included within the spirit and scope of the present application.

The invention claimed is:

1. A lifting mechanism, comprising: a battery, an electric machine, a hydraulic pump, an oil tank, a hydraulic cylinder and a work platform, wherein the lifting mechanism comprises a lifting mode, a hold mode and a lowering mode, and the lowering mode comprises an energy-regeneration mode in which hydraulic fluid drives the hydraulic pump to operate as a hydraulic motor, and thus in turn hydraulic fluid drives the electric machine to operate as a generator and charge the battery, wherein a proportional valve or switch valve is provided on a hydraulic line between the hydraulic pump and the hydraulic cylinder; the proportional valve or switch valve comprises a bidirectional communication position and a unidirectional communication position in which the hydraulic fluid is permitted to flow from the hydraulic pump to the hydraulic cylinder in a unidirectional way; in the lifting mode or the hold mode, the proportional valve or switch valve is in the unidirectional communication position, and in the lowering mode, the proportional valve or switch valve is in the bidirectional communication position; the hydraulic pump operates to increase a pressure in a hydraulic line between the hydraulic pump and the proportional valve or switch valve before the proportional valve or switch valve is switched from the unidirectional communication position to the bidirectional communication position, wherein the lowering mode further comprises a non-energy-regeneration mode, and the lifting mechanism further comprises a flow limiting valve, provided between the hydraulic cylinder and the proportional valve or switch valve, for limiting a maximum of a descending speed of the work platform, and wherein the flow limiting valve has a throttling resistance in a second position larger than that in a first position, and when a pressure difference across the flow limiting valve is larger than a predetermined pressure difference, the flow limiting valve switches from the first position to the second position.

2. The lifting mechanism according to claim 1, wherein further comprising: a control device, in response to receiving a lowering command, the control device controls the operation of the hydraulic pump to operate so that the pressure in the hydraulic line between the hydraulic pump and the proportional valve or switch valve is increased to a value equal to a pressure of the hydraulic cylinder or a pressure difference between the hydraulic cylinder and the hydraulic line is less than a predetermined value.

3. The lifting mechanism according to claim 1, wherein further comprising: a control device, the control device controls the proportional valve or switch valve to switch from the unidirectional communication position to the bidirectional communication position when the pressure in the hydraulic line between the hydraulic pump and the proportional valve or switch valve is increased to a value equal to a pressure of hydraulic cylinder or a pressure difference between the hydraulic cylinder and the hydraulic line is less than a predetermined value.

4. The lifting mechanism according to claim 1, wherein further comprising: a control device, the control device controls the proportional valve or switch valve to switch from the unidirectional communication position to the bidirectional communication position when the hydraulic pump has operated for a predetermined period of time.

5. The lifting mechanism according to claim 1, the proportional valve or switch valve is provided in a hydraulic line between the hydraulic pump and the hydraulic cylinder in a position adjacent to the hydraulic cylinder.

6. The lifting mechanism according to claim 1, wherein when the proportional valve or switch valve is a proportional valve, in the energy-regeneration mode, a descending speed of the work platform is controlled by the electric machine; in the non-energy-regeneration mode, the maximum of the descending speed of the work platform is set by an opening degree of the proportional valve or switch valve.

7. The lifting mechanism according to claim 1, wherein the flow limiting valve is provided adjacent to an outlet of the hydraulic cylinder.

8. The lifting mechanism according to claim 1, wherein in the energy-regeneration mode, the flow limiting valve is in the first position, and in the non-energy-regeneration mode, the flow limiting valve is in the second position.

9. The lifting mechanism according to claim 1, wherein the flow limiting valve comprises a proportional valve for continuously adjusting a flow resistance.

10. The lifting mechanism according to claim 1, wherein the lifting mechanism further comprises a throttle valve, in the energy-regeneration mode or the non-energy-regeneration mode, the flow limiting valve is in the first position, and in an abnormal descending of the work platform, the flow limiting valve is in the second position.

11. The lifting mechanism according to claim 1, wherein the lifting mechanism comprises two or more hydraulic cylinders, a corresponding flow limiting valve is provided adjacent to an outlet of each hydraulic cylinder, and each flow limiting valve is connected to the proportional valve or switch valve.

12. The lifting mechanism according to claim 1, wherein the lifting mechanism further comprises an overflow valve provided in parallel to the proportional valve or switch valve.

13. The lifting mechanism according to claim 1, wherein the lifting mechanism is a scissor lift or a forklift.

14. A lifting mechanism comprising:

a battery, an electric machine, a hydraulic pump, an oil tank, a hydraulic cylinder and a work platform, the lifting mechanism comprises a lifting mode, a hold mode and a lowering mode, and the lowering mode comprises an energy-regeneration mode in which hydraulic fluid drives the hydraulic pump to operate as a hydraulic motor, and thus in turn hydraulic fluid drives the electric machine to operate as a generator and charge the battery;

wherein a proportional valve or switch valve is provided on a hydraulic line between the hydraulic pump and the hydraulic cylinder; the proportional valve or switch valve comprises a bidirectional communication position and a unidirectional communication position in which the hydraulic fluid is permitted to flow from the hydraulic pump to the hydraulic cylinder in a unidirectional way; in the lifting mode or the hold mode, the proportional valve or switch valve is in the unidirectional communication position, and in the lowering mode, the proportional valve or switch valve is in the bidirectional communication position; the hydraulic pump operates to increase a pressure in a hydraulic line between the hydraulic pump and the proportional valve or switch valve before the proportional valve or switch valve is switched from the unidirectional communication position to the bidirectional communication position;

wherein the lowering mode further comprises a non-energy-regeneration mode, and the lifting mechanism further comprises a flow limiting valve, provided between the hydraulic cylinder and the proportional valve or switch valve, for limiting a maximum of a descending speed of the work platform; and wherein the flow limiting valve comprises a first orifice and a selection valve connected with each other, the selection valve has a communicating position and a throttling position in which a second orifice takes effect, when the selection valve is in the communicating position, the flow limiting valve is in a first position, and when the selection valve is in the throttling position, the flow limiting valve is in a second position.

15. The lifting mechanism according to claim 14, wherein the second orifice has a size less than that of the first orifice.

16. The lifting mechanism according to claim 15, wherein in the energy-regeneration mode, the descending speed of the work platform is controlled by the electric machine; in the non-energy-regeneration mode, the maximum of the descending speed of the work platform is set by the second orifice.

17. The lifting mechanism according to claim 14, wherein the selection valve further comprises a spring, when a pressure difference across the flow limiting valve is less than a predetermined pressure difference set by the spring, the selection valve is in the communicating position; when the pressure difference across the flow limiting valve is larger than the predetermined pressure difference set by the spring, the selection valve is in the throttling position.

18. A lifting mechanism comprises:

a battery, an electric machine, a hydraulic pump, an oil tank, a hydraulic cylinder and a work platform, the lifting mechanism comprises a lifting mode, a hold mode and a lowering mode, and the lowering mode comprises an energy-regeneration mode in which hydraulic fluid drives the hydraulic pump to operate as a hydraulic motor, and thus in turn hydraulic fluid drives the electric machine to operate as a generator and charge the battery;

wherein a proportional valve or switch valve is provided on a hydraulic line between the hydraulic pump and the hydraulic cylinder; the proportional valve or switch valve comprises a bidirectional communication position and a unidirectional communication position in which the hydraulic fluid is permitted to flow from the hydraulic pump to the hydraulic cylinder in a unidirectional way; in the lifting mode or the hold mode, the proportional valve or switch valve is in the unidirectional communication position, and in the lowering mode, the proportional valve or switch valve is in the bidirectional communication position; the hydraulic pump operates to increase a pressure in a hydraulic line between the hydraulic pump and the proportional valve or switch valve before the proportional valve or switch valve is switched from the unidirectional communication position to the bidirectional communication position;

wherein the lowering mode further comprises a non-energy-regeneration mode, and the lifting mechanism further comprises a flow limiting valve, provided between the hydraulic cylinder and the proportional valve or switch valve, for limiting a maximum of a descending speed of the work platform;

wherein the flow limiting valve comprises a proportional valve for continuously adjusting a flow resistance; and wherein the proportional valve has a maximum permissible opening degree which is set according to pre-calibrated data and in terms of a real-time pressure of the hydraulic cylinder correspondingly, or is directly set according to a maximum pressure of the hydraulic cylinder permitted by the work platform.

19. A lifting mechanism comprises:

a battery, an electric machine, a hydraulic pump, an oil tank, a hydraulic cylinder and a work platform, the lifting mechanism comprises a lifting mode, a hold mode and a lowering mode, and the lowering mode comprises an energy-regeneration mode in which hydraulic fluid drives the hydraulic pump to operate as a hydraulic motor, and thus in turn hydraulic fluid drives the electric machine to operate as a generator and charge the battery;

wherein a proportional valve or switch valve is provided on a hydraulic line between the hydraulic pump and the hydraulic cylinder; the proportional valve or switch valve comprises a bidirectional communication position and a unidirectional communication position in which the hydraulic fluid is permitted to flow from the hydraulic pump to the hydraulic cylinder in a unidirectional way; in the lifting mode or the hold mode, the proportional valve or switch valve is in the unidirectional communication position, and in the lowering mode, the proportional valve or switch valve is in the bidirectional communication position; the hydraulic pump operates to increase a pressure in a hydraulic line between the hydraulic pump and the proportional valve or switch valve before the proportional valve or switch valve is switched from the unidirectional communication position to the bidirectional communication position;

wherein the lowering mode further comprises a non-energy-regeneration mode, and the lifting mechanism further comprises a flow limiting valve, provided between the hydraulic cylinder and the proportional valve or switch valve, for limiting a maximum of a descending speed of the work platform; and wherein the descending lowering mode comprises the non-energy-regeneration mode, the lifting mechanism further comprises a throttle valve; in the energy-regeneration mode, a descending speed of the work platform is controlled by the electric machine; in the non-energy-regeneration mode, the descending speed of the work platform is set by a size of an orifice of the throttle valve; in an abnormal descending of the work platform, the maximum of the descending speed of the work platform is set by the flow limiting valve.

20. The lifting mechanism according to claim 19, wherein the lifting mechanism further comprises a reversing valve which performs switching between the energy-regeneration mode and the non-energy-regeneration mode by selectively connecting the hydraulic cylinder to the hydraulic pump or the oil tank, the throttle valve is provided between the reversing valve and the oil tank.

21. The lifting mechanism according to claim 20, wherein the lifting mechanism further comprises a controlling control device, the controlling control device is configured to switch a position of the reversing valve under a predetermined condition, such that the hydraulic cylinder is switched from a state of connection being connected with the hydraulic pump to a state of connection being connected with the oil tank, to switch from the energy-regeneration mode to the non-energy-regeneration mode.

22. The lifting mechanism according to claim 21, wherein the predetermined condition comprises any one of following: state-of-charge of the battery higher than a predetermined value, failure of the battery, failure of the electric machine, and other system failures.

23. The lifting mechanism according to claim 20, wherein the lifting mechanism further comprises a steering device, and the reversing valve connects one of the hydraulic pump and the oil tank to the steering device and connects the other of the hydraulic pump and the oil tank to the hydraulic cylinder.

* * * * *